(12) United States Patent
Shor et al.

(10) Patent No.: US 9,935,873 B2
(45) Date of Patent: Apr. 3, 2018

(54) DEVICE AND METHOD FOR PROCESSING IN A MOBILE COMMUNICATION SYSTEM

(71) Applicants: Roy Shor, Tel-Aviv (IL); Ori Goren, Kibutz Ruchama (IL); Amit Gur, Eyn Vered (IL); Gad Yuval, Hertzelia (IL)

(72) Inventors: Roy Shor, Tel-Aviv (IL); Ori Goren, Kibutz Ruchama (IL); Amit Gur, Eyn Vered (IL); Gad Yuval, Hertzelia (IL)

(73) Assignee: NXP USA, Inc., Austin, TX (US)

( * ) Notice: Subject to any disclaimer, the term of this patent is extended or adjusted under 35 U.S.C. 154(b) by 118 days.

(21) Appl. No.: 14/895,949

(22) PCT Filed: Jun. 18, 2013

(86) PCT No.: PCT/IB2013/054982
§ 371 (c)(1),
(2) Date: Dec. 4, 2015

(87) PCT Pub. No.: WO2014/203032
PCT Pub. Date: Dec. 24, 2014

(65) Prior Publication Data
US 2016/0134521 A1 May 12, 2016

(51) Int. Cl.
*H04L 12/721* (2013.01)
*H04L 12/861* (2013.01)
*H04L 12/64* (2006.01)

(52) U.S. Cl.
CPC .......... *H04L 45/38* (2013.01); *H04L 12/6418* (2013.01); *H04L 49/90* (2013.01); *H04L 49/9078* (2013.01)

(58) Field of Classification Search
None
See application file for complete search history.

(56) References Cited

U.S. PATENT DOCUMENTS

| | | |
|---|---|---|
| 2010/0227654 A1 | 9/2010 | Katou |
| 2012/0281679 A1 | 2/2012 | Fan et al. |
| 2013/0051277 A1 | 2/2013 | Hakola et al. |

(Continued)

OTHER PUBLICATIONS

International Search Report and Written Opinion correlating to PCT/IB2013/054982 dated Mar. 17, 2014.

(Continued)

*Primary Examiner* — Saba Tsegaye (57) ABSTRACT

A processor device processes data samples of a radio signal in a mobile communication system. A fast flow process is executed for all samples and a batch process is executed at intervals on a subset of the samples. The device has a processor for executing the flow process via a local buffer memory, a memory interface to a system memory, and a memory controller for controlling storing of the data samples in the buffer memory. The processor establishes whether data samples in the local buffer memory are part of the subset, and if not, invalidates them after executing the flow process. The memory controller provides free memory space in the local buffer by transferring data samples which are not invalidated from the local buffer memory to the system memory, and by invalidating processed samples. Advantageously the local buffer may be relatively small, while the amount of data transferred to the system memory is limited.

19 Claims, 5 Drawing Sheets

(56) References Cited

U.S. PATENT DOCUMENTS

| | | |
|---|---|---|
| 2013/0078948 A1 | 3/2013 | Pecen et al. |
| 2013/0107861 A1 | 5/2013 | Cheng et al. |
| 2014/0198684 A1* | 7/2014 | Gravely .................. H04L 43/18 370/254 |
| 2015/0173105 A1* | 6/2015 | Bergstrom .......... H04W 74/006 370/329 |
| 2015/0372930 A1* | 12/2015 | Shor ................... H04L 47/2458 370/329 |

OTHER PUBLICATIONS

Freescale Semiconductor, MSC8157 Six-Core Digital Signal Processor, Rev. 1, Dec. 2012.

Ericsson AB, et al., "CPRI Specification V5.0, Common Public Radio Interface (CPRI): Interface Specification," Sep. 21, 2011, pp. 1-119.

Freescale Semiconductor, Inc., "Next-Generation Wireless Network Bandwidth and Capacity Enabled by Heterogeneous and Distributed Networks" fact sheet; QorIQ Qonverge Portfolio, Sep. 2012, pp. 1-21.

Freescale Semiconductor, Inc., "QorIQ Qonverge B4860 Baseband Processor" fact sheet: www.freescale.com/QorIQQonverge, 2012, pp. 1-2.

\* cited by examiner

DEVICE AND METHOD FOR PROCESSING IN A MOBILE COMMUNICATION SYSTEM

FIELD OF THE INVENTION

This invention relates to a device and method for a mobile communication system. An example of a mobile communication system is a fourth generation (4G) cell based mobile communication system such as LTE system (Long Term Evolution, which is the most recent step forward from cellular 3G services) or the Wideband Code Division Multiple Access (W-CDMA) system.

An overview of such systems can be found in the white paper "Next-Generation Wireless Network Bandwidth and Capacity Enabled by Heterogeneous and Distributed Networks" by Freescale, which company also provides processors for such systems such as MSC8157 Six-Core Digital Signal Processor or B4860 "QorIQ Qonverge B4860 Baseband Processor". This processor targets macro cell base station designs for broadband wireless infrastructure and has four 64 bit, dual-threaded processor cores, six 16 bit 32GMAC/cycle calculation cores and baseband acceleration processing engines. It is designed to adapt to the rapidly changing and expanding standards of LTE (FDD and TDD), LTE-Advanced and WCDMA and supports different standards simultaneously. Technical data for the B4860 and MSC8157 processor is available via http://www.freescale.com/webapp/sps/site/prod summary.jsp?code=B4860 and http://www.freescale.com/webapp/sps/site/prod summary.jsp?code=MSC8157.

BACKGROUND OF THE INVENTION

In 4G cellular communication such as LTE, between two types of processes can be distinguished: a fast processing flow, called flow processing, executing every symbol (LTE symbol is ~71 us) and a batch processing, executing about every 1 ms.

One of the batch processes is called RACH, which stands for "Random Access Channel", and is in charge of identifying new mobile users (User Equipment, UE) that enter to the cellular cell's antenna range of the base station (eNodeB), and wish to join the network group of users that is already served by the cell, related to this antenna. When a new user enters the cell's antenna range, the mobile device starts sending specific signals, according to the RACH protocol, and waits for the cell to respond. The cell executes the RACH process periodically to check if new users are trying to connect, but not necessarily every 1 ms. As such, the RACH process is well known in 4G mobile communication systems.

RACH may be processed every 1 to 10 ms, according to the requirements of the cell, effectively determining how often new users are searched and how long can user may wait before being acknowledged to the network. The length of each RACH process communication is 1 ms, so if the RACH is processed only every 3 ms, we can say that only ⅓ of the received RACH data is required.

Figure 1:
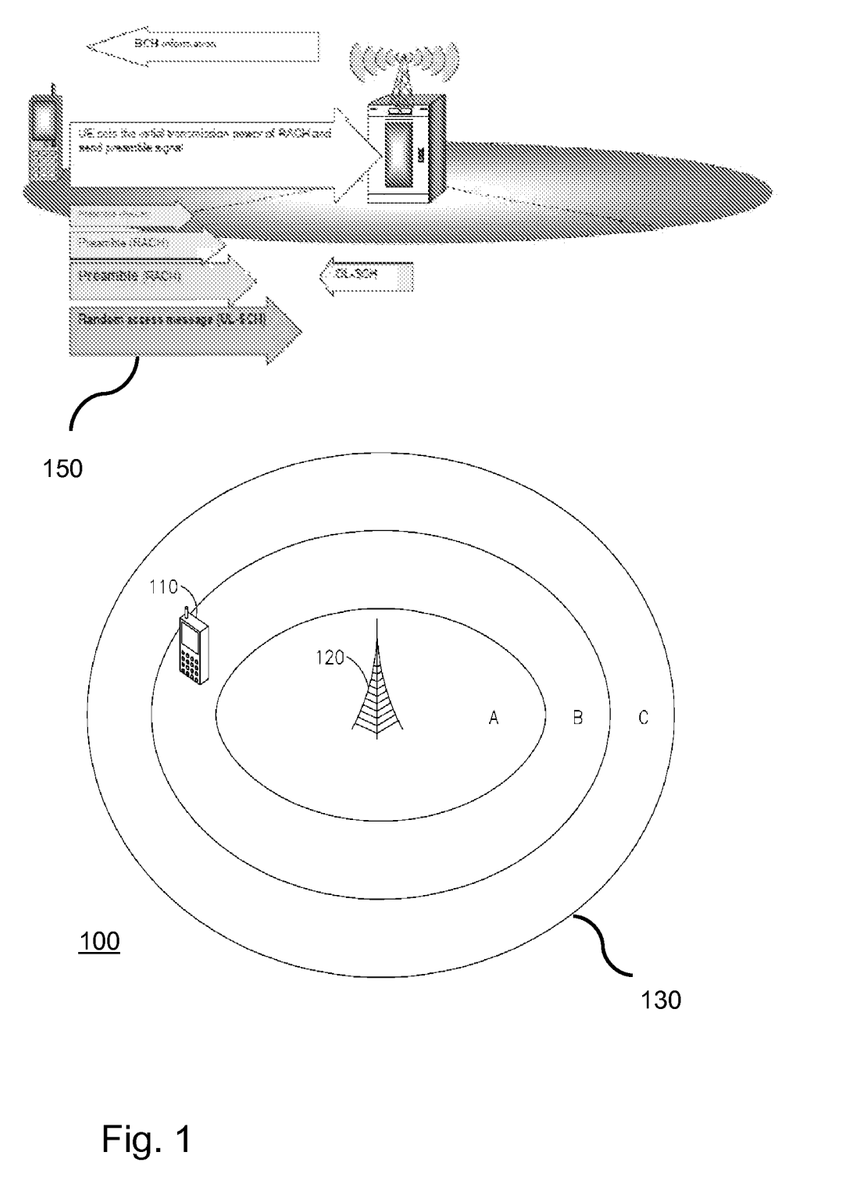
FIG. 1 schematically shows an overview of a mobile communication system and a RACH process.

FIG. 1 schematically shows an overview of a mobile communication system and the RACH process. In a mobile communication system 100 a base station 120 provides a cell 130 having an antenna range subdivided in three zones A, B and C differing is signal strength. A mobile device 110 is shown in zone B of the cell. Multiple mobile devices may be present in a cell, and new mobile devices may enter the cell.

In the Figure the RACH process 150 is schematically shown. When a mobile device called UE enters the cell it will receive BCH information transmitted by the base station as indicated by the first arrow (top arrow in Figure), which information is used by the UE set the initial transmission power and to send a preamble signal (second arrow). Subsequently, after one or more preambles, a further RACH signal is send (Random Access message for the uplink, UL-SCH), whereas the base station responds by sending a downlink message (DL-SCH) as indicated by further arrows.

Traditionally, all sample data of the radio signal from the antenna is transferred via an interface such as CPRI and is stored into a buffer in a designated memory until both the flow processing and the batch processing such as the RACH are processed. Hence a large buffer is required.

SUMMARY OF THE INVENTION

The present invention provides a processor device, method, computer program product and semiconductor device as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

DETAILED DESCRIPTION OF THE PREFERRED EMBODIMENTS

In cell based mobile communication systems base stations are provided to communicate with the mobile devices. Such base stations usually have a high frequency radio part, called Radio Equipment (RE), which RE is controlled by a further part called Radio Equipment Controller (REC). The REC may be located in the base-station cabinet, while the RE is usually located near the antennas. An interface between both parts has been standardized, and is called Common Public Radio Interface (CPRI).

The standard "Common Public Radio Interface (CPRI); Interface Specification V5.0 (2011-09-21)", as provided on http://www.cpri.info, describes a recent version of the interface, abbreviated CPRI V5. In general, sub-versions of the CPRI V5 are denoted as V5.x.

The Common Public Radio Interface (CPRI) configuration may comprise multiple Radio Equipment Controllers (REC) and multiple Radio Equipments (RE) connecting point to point in a chain network using very high frequencies (up to 9.8 GHz). Data samples are received at the RE and interfaced via an IQ data link to the REC, in a data format based on the I and Q components of the modulated signal. Besides IQ data link, CPRI supports further types of communication and management (C&M) data: a Vendor Specific ("VSS") channel, a HDLC ("slow C&M channel") and an Ethernet link ("fast C&M channel").

Figure 2:
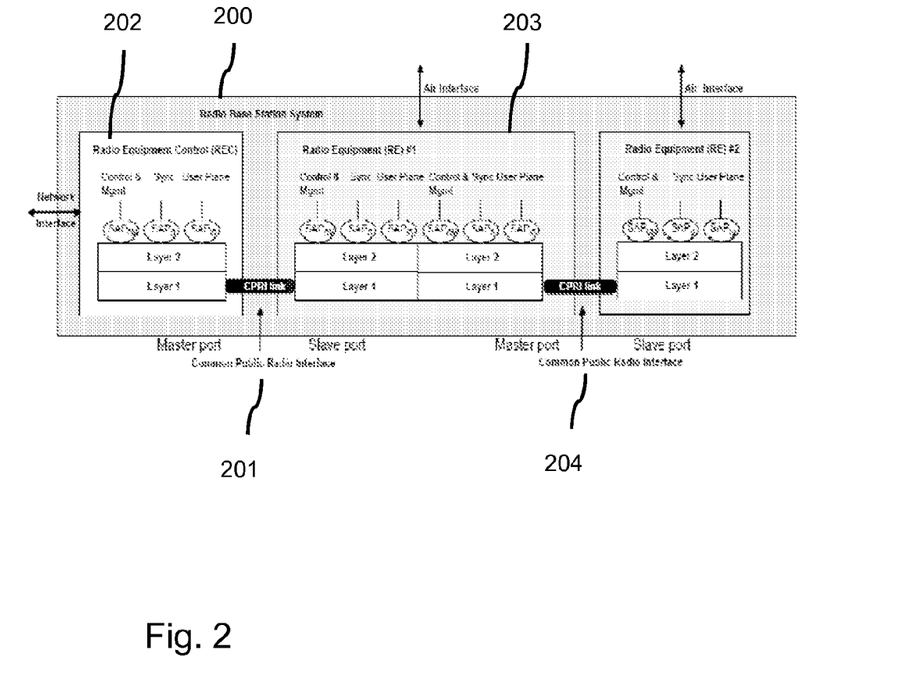
FIG. 2 shows an example of a radio base station system and communication interface connectivity.

FIG. 2 shows an example of a radio base station system and communication interface connectivity. The Figure shows an example of a base station architecture 200 comprising a CPRI interface 201 between a REC 202 and an RE 203. A further CPRI interface 204 may be provided to interconnect multiple REs. As such, the CPRI interface is described in the CPRI V5 and chapter 2 describes the CPRI related parts of the basic radio base station system architecture. The Figure is taken from chapter 2 (see CPRI V5, FIGS. 2 and 2A on page 10) and is further described in chapter 2.2 System Architecture of the CPRI standard. Via the CPRI the received signal data IQ samples are transferred to the REC for further processing.

Figure 3:
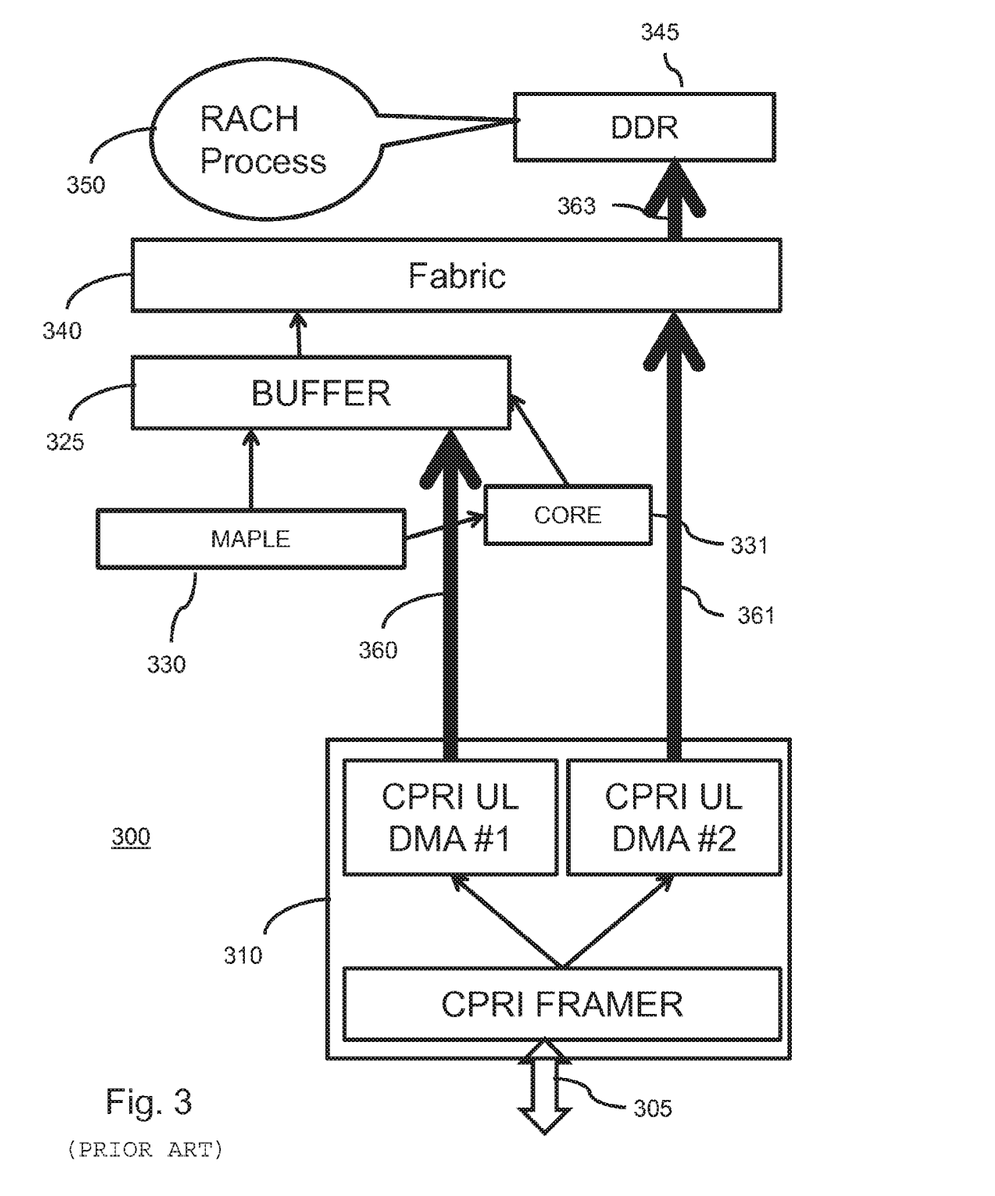
FIG. 3 shows an example of a processor device and a prior art data flow.

FIG. 3 shows an example of a processor device and a prior art data flow. The processor device 300 has a communication interface 305 provided via a communication interface unit 310, for example a CPRI controller having a CPRI framer for formatting (framing and de-framing) the data traffic on the communication interface, and at least one direct memory access unit (DMA). The example device has a first DMA unit for the uplink (UL) is marked CPRI UL DMA#1, which transfers all sample data to a buffer 325 as indicated by a first data flow arrow 360. Also, the example device has a second DMA unit for the uplink (UL) is marked CPRI UL DMA#2, which transfers all sample data to a system memory 345 as indicated by a second data flow arrow 361. The system memory may be an external dynamic RAM memory of the well known DDR type, coupled to the device via a bus interconnect unit 340 called Fabric. A third data flow arrow 363 indicates that all sample data is further transferred from the bus interconnect unit to the system memory.

In the example system, flow processing is performed on the sample data in the local buffer 325. Thereto the device has a core processor 331, and may have a further calculation processor for signal processing, such as a MAPLE processor 330, to constitute a signal processing arrangement arranged for flow processing. Furthermore, batch processing 350, such as RACH processing on RACH data, is performed on sample data in the system memory, for example by a separate processor or as a further task of the core processor 331. In the Figure arrow direction indicates initiator to target, e.g. core to buffer. The core/maple processors are initiators only on the buffer; the buffer never initiates a data transaction. A data transaction may involve reading or writing buffer locations. The arrow from MAPLE to CORE marks an interrupt.

In the above example, all sample data received from the antenna is stored into a big buffer in a designated memory until the RACH is processed, even though only partial data is required for this task. However, the core decides what is the relevant data out of all sample data. So the core may decide which data is relevant for the RACH processing based on symbol awareness, coming from either SoC timers or a CPRI controller. The antenna data is received through a CPRI (Common Public Radio Interface) and the CPRI DMA is agnostic to the data characteristics, i.e. all the data is directed to both designated memories. In the example it is assumed that on-chip internal memory (buffer 325) is too small to hold the entire symbol data required for LTE-RACH processing, and therefore a big buffer is created in the DDR.

Since most of this data is required as well for fast-processing, the CPRI interface unit has to write the antenna data to two target memories: local buffer cache for flow processing and DDR for batch-processing. Hence, the DDR is loaded with redundant traffic in CPRI-LTE Use Case since the CPRI DMA cannot distinguish between different portions of the data, and the entire CPRI data is delivered both to local buffer cache and DDR. So, as shown in FIG. 3, all data is both delivered to cache buffer and system memory, using two DMA engines in the CPRI controller.

It is desired that memory throughput is reduced in LTE applications based on the RACH processing requirements. In practical cases the memory throughput of the CPRI data to the system memory for batch processing such as RACH can be reduced to one third. For example, DDR throughput in LTE 20 MHz at 24 AxC (UL) (Antenna-Carrier data units Uplink): 2.7 GB/s, which is a significant part of the available memory bandwidth, e.g. about 14.9 GB/s of DDR3 @ 1.867 GHz. Such a reduction may be achieved as follows.

Figure 4:
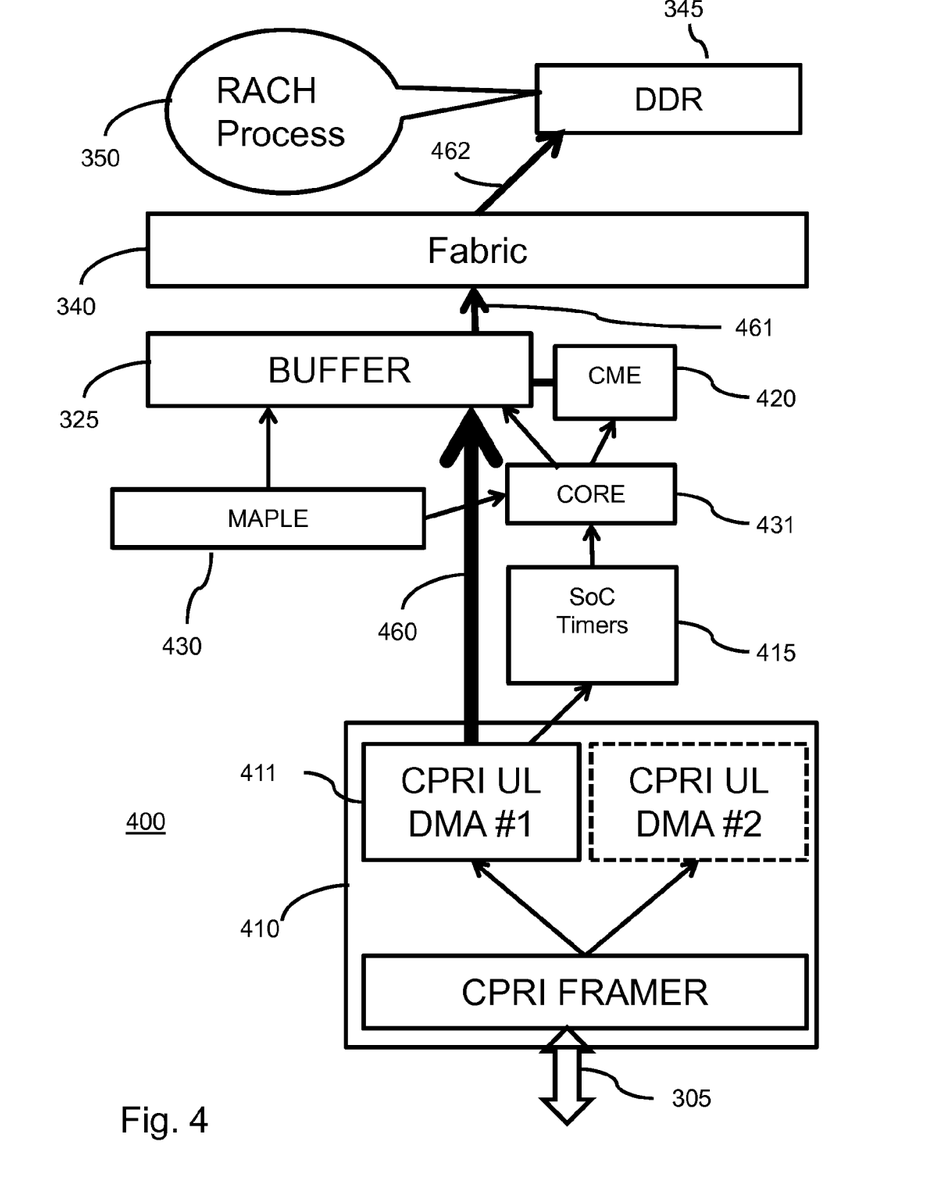
FIG. 4 shows an example of a processor device and a selective data flow.

FIG. 4 shows an example of a processor device and a selective data flow. The processor device 400 is for a mobile communication system and has a communication interface 305 for receiving data samples of a radio signal. The processing includes at least one flow process to be executed for respective, consecutive signal parts in the received radio signal and at least one batch process 350 to be executed at intervals on a subset of the signal parts. It is noted that the processing of an incoming signal on consecutive signal parts may apply to any type of signal, where it is known that the incoming signal contains elements or is formatted according to a predetermined modulation scheme. A receiving device may apply the flow processing on substantially all parts at a relatively fast processing rate, where other signal processing functions are only required to be processed at a limited amount of the incoming signal parts at predetermined or selected instants or intervals, the latter processing being called batch processing. In the example described here the signal parts correspond to symbols in a radio signal, and the subset is based on knowledge of symbol boundaries and the function of the respective symbols. However, any type of data may constitute said signal parts, while the processor is aware of the function of specific signal parts that have to be batch processed. It is noted that the processor itself may detect or be aware of the boundaries of the signal parts, but may also be coupled to further units such as timers or synchronization circuits to determine the signal parts.

The device has a local buffer memory 325 accessible for a processor, for example core processor 431 and/or signal processor MAPLE 430, for executing the flow process. Also the device has a memory interface 340 to a system memory 345 accessible for executing the batch process 350. It is noted that the batch process may be executed by a further processor or may be a task performed by the same processor as said flow processing, e.g. the core processor.

Furthermore, the device has a memory controller 420, also called cache management engine CME, configured for controlling storing of the data samples of the radio signal in the local buffer memory. The processor includes an establishing function for establishing whether data samples in the local buffer memory are part of the subset of signal parts that are required for the batch processing. If samples are not required for batch processing, the establishing function invalidates such data samples in the local buffer memory after executing the flow process. Invalidated samples are marked so that the contents of the memory locations are no longer valid and the locations in the buffer memory are free for storing new data. The memory controller is further configured for providing free memory space in the local buffer by transferring data samples which are not invalidated from the local buffer memory to the system memory. The operation may be part of a cache management function and achieves the result of selectively moving data, i.e. data that has not been invalidated after being processed by the flow process, to the system memory. The data is marked for batch processing by the above selective invalidation of data that is only required for the flow processing. The providing of free space may be triggered for a section of the buffer memory after executing the flow process on a respective signal part, and may involve reading the corresponding data samples from the local buffer memory that are not invalidated and subsequently storing such data samples in the system memory. Invalidated means that data is marked as being not valid; i.e. the location in memory is free and may be used for new data. For example, the modified data in the L2 cache may be written back to the DDR (flushed) or locally marked as non-relevant (invalidated), and hence, would not be written back to the DDR. Consequently, the required data in DDR (necessary for RACH processing) are flushed to the DDR by the L2 behavior as cache. The redundant data is marked as invalid (by the CME) and hence not flushed to the DDR.

In practice, the communication interface 305 may be provided via a communication interface unit 410, for example a CPRI controller having a CPRI framer for formatting the data traffic on the communication interface, and at least one direct memory access unit (DMA). The example device has a first DMA unit 411 for the uplink (UL) is marked CPRI UL DMA#1, which transfers all sample data to the buffer 325 as indicated by a first data flow arrow 460. The example device may have a further DMA unit for the uplink (UL) is marked CPRI UL DMA#2, as indicated by a dashed box, for other data transfers, but not required for the currently discussed functions. The system memory may be an external dynamic RAM memory of the well known DDR type, coupled to the device via the memory interface 340, such as a bus interconnect unit called Fabric. The memory controller 420 may be called cache memory engine CME, and is configured for managing the data stored in the buffer and the system memory.

In the example system, the flow processing is performed on the sample data in the local buffer 325. Thereto the core processor 431, and optionally a further calculation processor for signal processing such as a MAPLE processor 430, constitutes a signal processing arrangement generally called a processor. Furthermore, batch processing 350, such as RACH processing, is performed on sample data in the system memory, for example by a separate processor or as a further task of the core processor 431.

Optionally, in the processor device the processor is configured for detecting symbols corresponding to signal parts, and said establishing comprises selecting the subset of signal parts based on the detected symbols. Symbols represent data in sections of the radio signal as defined in the radio communication modulation system. The flow processing includes a main task to derive the symbols from the received data samples. Hence, the flow processing can also detect the symbols and select the subset of radio signal parts that are relevant for batch processing, as the subset depends on detected symbols. In practice, following a symbol awareness interrupt that allows a sub-frame calculation, and an interrupt coming from MAPLE processor indicating that the sample data has been processed, the core directs the memory controller to invalidate the data in the local buffer for sub-frames which are not needed in the batch process.

Optionally, the processor device may comprise at least one system timer 410 arranged for symbol timing. As such, the system timers may be used for timing radio signal related events, and are known as such. In the embodiment, the timers are called SoC timers and are in charge of the symbol awareness. The core processor is in charge of configuring the SoC timers, and answering their events; and based on that configure the CME and evoke it on the relevant time frame. The CME off-loads the core in invalidation tasks. So, the processor is coupled to the system timer for detecting the symbols. Furthermore, the processor may be configured for calculating an ending of a subframe and a beginning of a subframe in the radio signal. The subframe is a signal part in the radio signal and corresponds to at least one symbol according to the mobile communication system. The above mentioned batch processing is required for a subset of the subframes.

Optionally, the local buffer memory is constituted by private cache memory for data samples only, partitioned from a device memory provided in the device. In practice, Furthermore, a partition capability may be provided for the local buffer that enables to define a specific cache. Such a cache is a special partition inside a larger local cache memory, and is assigned just for this data. Such cache constitutes a "private" cache.

Optionally, in the processor device, the memory controller is configured for performing a coherency process so that all data samples which are not invalidated are stored either in the local buffer memory and/or in the system memory. Coherency means that every initiator on the fabric requesting a read/write pieces of data from DDR memory, will get the most updated data (whether this data is in the DDR or locally in other cache). Hardware coherency makes sure, by a hardware circuit, that every initiator on the fabric (e.g. all caches) either has the most fresh piece of data, or knows that it doesn't have it, and need to get it from the DDR (without the need to synchronize by software). The memory controller 420 may further include the coherency function for keeping the system coherency. When the dedicated cache gets full (in this case only referring to the specific partition), the memory controller is keeping the system coherency, and may flush some data to the system memory. In practice the coherency feature in the device assures that any data copy held in any system cache can be synchronized (i.e. made coherent) with the data held in the external system memory (DDR).

Optionally, in the processor device, the memory controller is further configured for providing said free memory space by transferring data samples of a respective signal part after the flow process has been performed for the respective signal part. So, after the respective signal part has been processed by the flow processing as required, a cleanup function of the memory controller is started.

Optionally, the processor device has a direct memory access unit configured for transferring the data samples only to the local buffer memory. In FIG. 4 the function of the first DMA unit 411 for transferring data samples only to the local buffer 325 is indicated by first dataflow arrow 460. It is noted that the DMA unit may also be coupled to the system clock 415 for transferring data according to the timing of symbols. Furthermore, the processor device may have an interface controller 410 for controlling the communication interface, and the interface controller 410 includes the direct memory access unit 411.

As shown in the examples above, the communication interface may be a common public radio interface according to a version of a common public radio interface standard (CPRI).

In practice, the proposed device as shown in FIG. 4 may be used in an LTE communication system as follows. The RACH process in LTE is executed only for the Up-Link (UL) processing (user transmit, the cell receives), and is done in resolution of LTE sub-frames (1 ms). All data that is being received by CPRI is only sent to the local buffer, also called level 2 (L2) cache. Symbols in the radio signal data samples are detected by a so-called symbol awareness mechanism, for example by the core processor. Based on a symbol awareness mechanism, only the sample data corresponding to relevant symbols that are required for the RACH processing are sent to the DDR. In other words, instead of using CPRI DMA in multi-unicast mode as shown in FIG. 3, where the same data is written to both the local buffer and system memory, the DMA unit now works in single unicast mode and writes the data once, only to the local buffer cache.

For sub-frames of which data sample are required for the fast processing, but not required for RACH processing, the core can instruct the cache system via the CME (Cache Management Engine) to invalidate the data of sub-frames which are not needed in the system memory (DDR). The selective invalidation is done according to the symbol awareness mechanism, which allows the core to calculate the ending of a sub-frame and the beginning another, together with the acknowledgement that the flow processing does not require any more the sample data in the local cache buffer. Consequently, the data necessary for RACH processing are transferred to the DDR by the memory controller. Sample data that has been invalidated by the memory controller is considered redundant data and is not transferred to the system memory. Hence only relevant data is transferred to the system memory from the local buffer as indicated by second data flow arrow 461, via the bus interconnection unit 340 to the system memory 345 as indicated by a third data flow arrow 462. To illustrate that only about ⅓ of the data samples are transferred to the system memory, second and third arrows 461,462 are thinner that first arrow 460 that represents all data samples. The selective data flow and resulting reduction are based on knowledge of the LTE processing stages (including its RACH part), with the specific knowledge that the RACH processing can be done on 1 sub frame out of X sub frames, where X is determined by the system user, and may be used to determine the service quality.

It is noted that, optionally, if sometimes not all redundant data was invalidated in time, e.g. due to the inaccuracy of the symbol awareness mechanism, still most of the data reduction is achieved.

When using a separate memory controller such as the CME (Cache Management Engine), the core is not loaded by the invalidation commands. However it is noted that, optionally, the tasks of the memory controller may also be performed by the core processor. Similarly, the tasks of the calculator MAPLE may be performed by a fast core processor.

So FIG. 4 shows the selective flow, and the hardware modules used, while the above description indicates the functions implemented in software on the modules. It is noted that the hardware may be present in a chip because of other reasons as well. In the selective flow, the data is transferred to the local buffer (also called L2/M2 cache) only using the DMA unit in the CPRI controller. Using the cache-coherency characteristic only the required portions of the data are transferred into the DDR. The decision of which portion to move is based on the symbol awareness mechanism, which may be implemented by the system timers.

The selective data flow has the effect of significantly reducing the data traffic to the system memory (also called DDR utilization), and also saves power on both off-chip DDR transactions and on-chip transactions. Moreover, there is no need for a large on-chip SRAM memory, which saves both area and power. Optionally, the memory controller is enabled to further control the validity of the data, for example, if some of the fast processing flows is delayed for some reason, the data which is yet to be processed is not invalidated and may be kept in the DDR, and is not overwritten as would have happened if a cyclic buffer was used.

Figure 5:
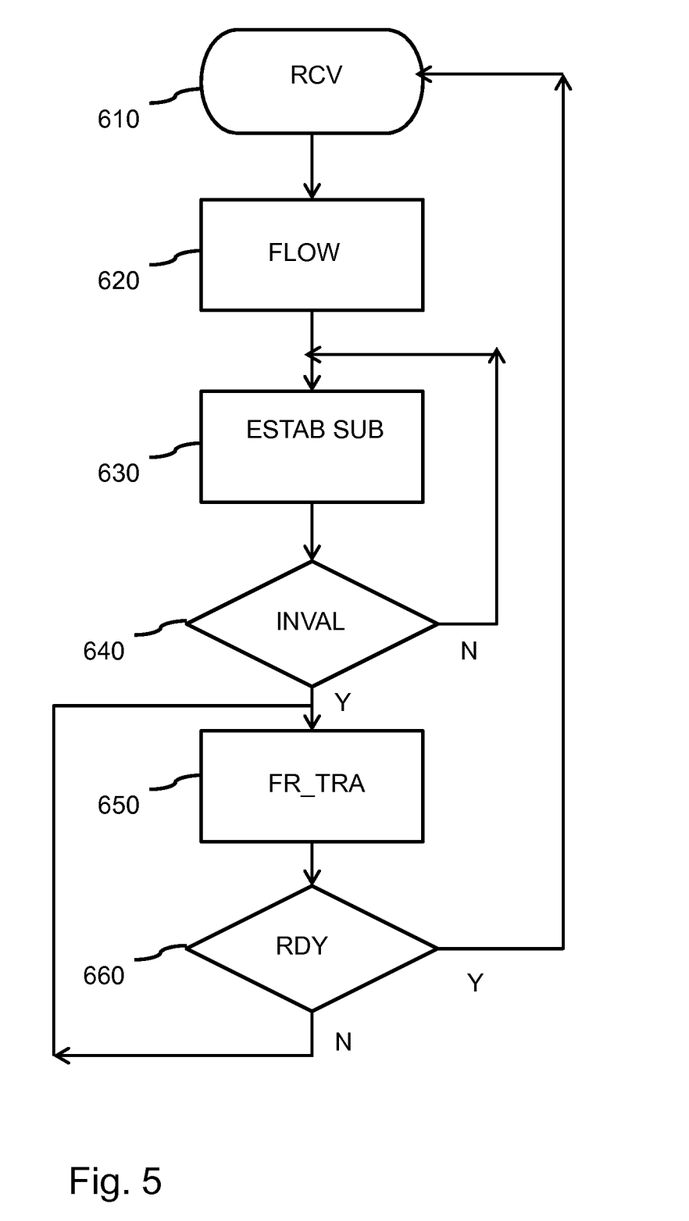
FIG. 5 shows an example of a method of processing data samples of a radio signal.

FIG. 5 shows an example of a method of processing data samples of a radio signal. In a first step RCV 610 the data samples are received in a processing device via a communication interface in a mobile communication system. In a next step FLOW 620 the processing comprising at least one flow process executed for a respective signal part in the received radio signal. The processing further comprises at least one batch process (not shown in the Figure) to be executed at intervals on a subset of the signal parts.

The device has a local buffer memory accessible for executing the flow process, a memory interface to a system memory accessible for executing the batch process, and a memory controller for controlling storing of the data samples of the radio signal in the local buffer memory.

The method continues by a step ESTAB_SUB 630 that establishes whether data samples in the local buffer memory are part of the subset of signal parts on which the batch process is to be executed. After a respective sample (or set of data samples) has been processed by the flow process, and if it has been established that the signal part is not included in the subset, a step INVAL 640 invalidates the data sample (s). It is noted that the flow process, the establishing process and the invalidation process may be performed in parallel, while receiving the data samples may be a substantially continuous flow. Effectively, for a signal part not part of the subset, the data samples in the local buffer memory are invalidated after executing the flow process. In a next step FR_TRA 650, free memory space is provided in the local buffer by transferring data samples which are not invalidated from the local buffer memory to the system memory. A final step RDY 660 determines whether sufficient space is free, or whether all data samples that are processed by the flow process have been transferred, and if so, the method returns to the initial state RCV 610. Effectively, the method creates a selective stream of data samples to the system memory, the selective stream substantially only comprising data samples that are required for the batch process. Optionally, the method, possibly implemented in software, may be configured to perform any of the data processing and/or memory caching functions according to any of the above described embodiments.

The above data processing and memory caching system for radio data may be implemented in any radio device that receives radio data samples that need to be processed by multiple processes, for example a radio controller in a mobile device or in a base station. For example, the device is a radio control unit (REC, 202 in FIG. 2) in a base station (120 in FIG. 1). Also, the device may be a semiconductor device for a communication device, in the form of an integrated circuit, such as a Field Programmable Gate Array (FPGA), a microcontroller including peripherals circuits, a digital signal processor (DSP), or a suitably programmed general purpose processor (GPP). Also, the device may be a receiver comprising such a programmable processor, the programmable processor being arranged to execute a program code comprising instructions for causing the programmable processor to perform the method. Also, the receiver may comprise a semiconductor circuitry, the semiconductor circuitry being specially designed to execute the above method.

Optionally, the program code may be provided on a computer readable medium, also called a medium comprising a computer program product, the computer program product comprising instructions for causing a processor apparatus to perform the above interfacing method. The computer program product may further comprise instructions for causing a processor apparatus to perform other processing stages of the receive chain, such as frequency domain processing. The computer program product may be embodied on a computer readable medium as physical marks or by means of magnetization of the computer readable medium, e.g. an optical disc, a hard disk, solid state memory, flash memory, etc., and may be non-recordable or recordable.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Some of the above embodiments, as applicable, may be implemented using a variety of different information processing systems. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device. Also, devices functionally forming separate devices may be integrated in a single physical device. Also, the units and circuits may be suitably combined in one or more semiconductor devices.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. Processor device for processing data samples of a radio signal received via a communication interface in a mobile communication system, the processing comprising at least one flow process to be executed for respective, consecutive signal parts in the received radio signal and at least one batch process to be executed on a subset of the signal parts, the processor device comprising:
 a processor configured to execute the flow process;
 a local buffer memory accessible for the processor;
 a memory interface to a system memory accessible for executing the batch process; and a memory controller configured to control storing of the data samples of the radio signal in the local buffer memory, the processor further configured to establish whether data samples in the local buffer memory are part of the subset of signal parts, and if not, invalidating the data samples in the local buffer memory after executing the flow process, the memory controller further configured to provide free memory space in the local buffer by transferring data samples which are not invalidated from the local buffer memory to the system memory.

2. Processor device as claimed in claim 1, wherein the processor is configured to detect symbols corresponding to signal parts, and said establishing comprises selecting the subset of signal parts based on the detected symbols.

3. Processor device as claimed in claim 2, wherein the device comprises at least one system timer configured for symbol timing, and the processor is coupled to the system timer for detecting the symbols.

4. Processor device as claimed in claim 2, wherein the processor is configured for calculating an ending of a subframe and a beginning of a subframe, the subframe being a signal part in the radio signal and corresponding to at least one symbol according to the mobile communication system.

5. Processor device as claimed in claim 1, wherein the local buffer memory is constituted by private cache memory for data samples only, partitioned from a device memory provided in the device.

6. Processor device as claimed in claim 1, wherein the memory controller is configured to perform a coherency process so that all data samples which are not invalidated are stored in at least one of the local buffer memory or the system memory.

7. Processor device as claimed in claim 1, wherein the memory controller is further configured to provide said free memory space by initiating said transferring data samples of a respective signal part after the flow process has been performed for the respective signal part.

8. Processor device as claimed in claim 1, wherein the device comprises a direct memory access unit configured for transferring the data samples only to the local buffer memory.

9. Processor device as claimed in claim 8, wherein the device comprises an interface controller for controlling the communication interface, and the interface controller comprises the direct memory access unit.

10. Processor device as claimed in claim 1, wherein the communication interface is a common public radio interface according to a version of a common public radio interface standard.

11. Radio controller for a base station in a mobile communication system, the radio controller device comprising the processor device as claimed in claim 1.

12. Integrated circuit comprising the processor device according to claim 1.

13. Method of processing data samples of a radio signal received in a processing device via a communication interface in a mobile communication system, the processing comprising at least one flow process to be executed for respective, consecutive signal parts in the received radio signal and at least one batch process to be executed at intervals on a subset of the signal parts, the device comprising:
a local buffer memory accessible for executing the flow process,
a memory interface to a system memory accessible for executing the batch process, and
a memory controller for controlling storing of the data samples of the radio signal in the local buffer memory, and the method comprising:
establishing whether data samples in the local buffer memory are part of the subset of signal parts, and if not, invalidating the data samples in the local buffer memory after executing the flow process; and
providing free memory space in the local buffer by transferring data samples which are not invalidated from the local buffer memory to the system memory.

14. Method as claimed in claim 13, wherein the establishing comprises detecting symbols corresponding to signal parts, and selecting the subset of signal parts based on the detected symbols.

15. Method as claimed in claim 14, wherein the establishing comprises calculating an ending of a subframe and a beginning of a subframe, the subframe being a signal part in the radio signal and corresponding to at least one symbol according to the mobile communication system.

16. Method as claimed in claim 13, comprising partitioning a private cache memory from a device memory provided in the device for constituting the local buffer memory for data samples only.

17. Method as claimed in claim 13, comprising performing a coherency process so that all data samples which are not invalidated are stored either in the local buffer memory or in the system memory.

18. Method as claimed in claim 13, wherein the method comprises providing said free memory space by transferring data samples of a respective signal part after the flow process has been performed for the respective signal part.

19. Method as claimed in claim 13, wherein the communication interface is a common public radio interface according to a version of a common public radio interface standard.

* * * * *